(12) United States Patent
Hung et al.

(10) Patent No.: US 8,902,201 B2
(45) Date of Patent: Dec. 2, 2014

(54) ASSEMBLING INFRARED TOUCH CONTROL MODULE

(71) Applicants: Iman Hung, New Taipei (TW); Chien-Ta Lin, New Taipei (TW); Eric Huang, New Taipei (TW); Sean Chen, New Taipei (TW)

(72) Inventors: Iman Hung, New Taipei (TW); Chien-Ta Lin, New Taipei (TW); Eric Huang, New Taipei (TW); Sean Chen, New Taipei (TW)

(73) Assignee: Top Victory Investments Ltd., Kowloon (HK)

( * ) Notice: Subject to any disclaimer, the term of this patent is extended or adjusted under 35 U.S.C. 154(b) by 17 days.

(21) Appl. No.: 13/845,188

(22) Filed: Mar. 18, 2013

(65) Prior Publication Data

US 2014/0264036 A1 Sep. 18, 2014

(51) Int. Cl.
*G06F 3/042* (2006.01)
(52) U.S. Cl.
CPC .................................. *G60F 3/0421* (2013.01)
USPC ............................ 345/175; 345/156; 345/173
(58) Field of Classification Search
CPC ............. G09G 1/00; G09G 5/00; G09G 5/34;
G06F 3/044; G06F 1/1626; G06F 3/0488;
G06F 1/16; G06F 3/016; G06F 3/041; G06F
11/3013; G06F 11/3055; G06F 11/328;
G06F 12/0646; G06F 13/10; G06F 19/3462;
G06F 1/1613; G06F 1/1616
USPC ......................................... 345/173–181, 156
See application file for complete search history.

(56) References Cited

U.S. PATENT DOCUMENTS

| | | | |
|---|---|---|---|
| 2009/0141003 A1* | 6/2009 | Xuan et al. ..................... | 345/175 |
| 2011/0096034 A1* | 4/2011 | Huang ........................... | 345/175 |
| 2012/0099818 A1* | 4/2012 | Shibata et al. .................. | 385/33 |

* cited by examiner

*Primary Examiner* — Duc Dinh
(74) *Attorney, Agent, or Firm* — Alan D. Kamrath; Kamrath IP Lawfirm, P.A.

(57) ABSTRACT

An assembling infrared touch control module includes four L-shaped first frame members and a plurality of straight second frame members matched in pairs. Each first and second frame member has a space therein and two openings at two ends thereof, respectively, in communication with the space. Each space has a circuit board therein. Each circuit board has a plurality of infrared transmitter/receiver components thereon and two connectors thereon at the two openings, respectively. The four first frame members and the second frame members, whose number may be increased or decreased by demand, are assembled together to form a frame by the connectors, so that an active touch area of the frame may be resized by demand to be adapted to a display device of any size, and an additional touch control function adapted to an extended area for the display device may be set.

9 Claims, 8 Drawing Sheets

ASSEMBLING INFRARED TOUCH CONTROL MODULE

BACKGROUND OF THE INVENTION

1. Field of the Invention

The invention relates to an infrared touch control module. More particularly, the invention relates to an assembling infrared touch control module.

2. Description of Related Art

Nowadays, many display devices employ built-in or add-on infrared touch control modules. The infrared touch control module provides a touch control function on the screen of the display device and may further provide another touch control function about the setting of the display device, such as voice volume, color contrast or brightness, to take the place of conventional physical keys disposed on the front frame of the display device to allow more different appearance designs to be made in the front frame. However, each infrared touch control module is designed to have a frame of a fixed size to be adapted to a corresponding display device of a specific size, and an active touch area of the infrared touch control module is designed to be within an active display area of the display device, so that the range of the active touch area is not adjustable.

Although some assembling infrared touch control modules are developed afterward, each assembling infrared touch control module is also designed to have a frame of a fixed size to be adapted to a corresponding display device of a specific size. For example, a detachable waterproof infrared touch screen frame has been provided and includes four integrally formed infrared filtering frames. Each infrared filtering frame is of a frame body structure with a cavity and peripheral walls, and ports of the adjacent infrared filtering frames are seamlessly connected through corner parts and closed waterproof rings. A circuit board is arranged in the cavity of each infrared filtering frame, and a control circuit element, an infrared transmitting element and an infrared receiving element are welded on the circuit board.

For users, each above-mentioned infrared touch control module is adapted to a corresponding display device of a specific size but not adapted to another display device of another specific size. For designers, each above-mentioned infrared touch control module has an active touch area of a fixed size, so that there is no extended area for adding additional touch control function. Display devices of different sizes need infrared touch control modules having frames of different sizes, resulting in many molds of the frames and higher cost.

SUMMARY OF THE INVENTION

The invention provides an assembling infrared touch control module for assembling a frame of an appropriate size to be adapted to a display device of any size.

According to an aspect of the invention, there is provided an assembling infrared touch control module including four L-shaped first frame members. Each first frame member has a first space therein and two first openings at two free ends of two arms thereof, respectively, in communication with the first space. Each first space has a first circuit board therein. Each first circuit board has a plurality of first infrared transmitter/receiver components thereon in the two arms and two first connectors thereon at the two first openings, respectively. The four first frame members are assembled together to form a first frame by the first connectors, and the first infrared transmitter/receiver components provide a first active touch area for the first frame.

In an embodiment of the invention, in the first frame, each first frame member has a rectangular, trapezoidal, or semicircular cross-section, and each first connector is a serial peripheral interface (SPI) connector.

In another embodiment of the invention, when the four first frame members are assembled together to form the first frame, a program pre-installed in one of the four first frame members is executed to check whether the first frame is correctly assembled or not. If the first frame is correctly assembled, a gain and a scanning type for the first infrared transmitter/receiver components are automatically set by the program. In addition, when the first active touch area of the first frame is larger than an active display area of a display device, a touch control function adapted to an extended area which is within the first active touch area and outside the active display area is set by the program.

In another embodiment of the invention, the assembling infrared touch control module further includes a plurality of straight second frame members matched in pairs. Each second frame member has a second space therein and two second openings at two ends thereof, respectively, in communication with the second space. Each second space has a second circuit board therein. Each second circuit board has a plurality of second infrared transmitter/receiver components thereon and two second connectors thereon at the two second openings, respectively. The four first frame members and the second frame members matched in pairs are assembled together to form a second frame by the first connectors and the second connectors, and the first infrared transmitter/receiver components and the second infrared transmitter/receiver components provide a second active touch area for the second frame.

In another embodiment of the invention, in the second frame, each first frame member and second frame member has a rectangular, trapezoidal, or semicircular cross-section, and each first connector and second connector is a SPI connector.

In another embodiment of the invention, when the four first frame members and the second frame members matched in pairs are assembled together to form the second frame, a program pre-installed in one of the four first frame members is executed to check whether the second frame is correctly assembled or not, and, if the second frame is correctly assembled, a gain and a scanning type for the first infrared transmitter/receiver components and the second infrared transmitter/receiver components are automatically set by the program. In addition, when the second active touch area of the second frame is larger than an active display area of a display device, a touch control function adapted to an extended area which is within the second active touch area and outside the active display area is set by the program.

Therefore, the assembling infrared touch control module according the invention employs the four first frame members and the second frame members whose number may be increased or decreased by demand to be assembled together to form the frame (i.e. the first frame or the adjustable second frame), so that the active touch area (i.e. the first active touch area or the adjustable second active touch area) of the frame may be resized by demand. A user or designer may apply the assembling infrared touch control module to a display device of any size and set a touch control function adapted to an extended area for the display device.

BRIEF DESCRIPTION OF THE DRAWINGS

The invention will be described in further detail below under reference to the accompanying drawings, in which.

DETAILED DESCRIPTION OF THE INVENTION

Figure 1:
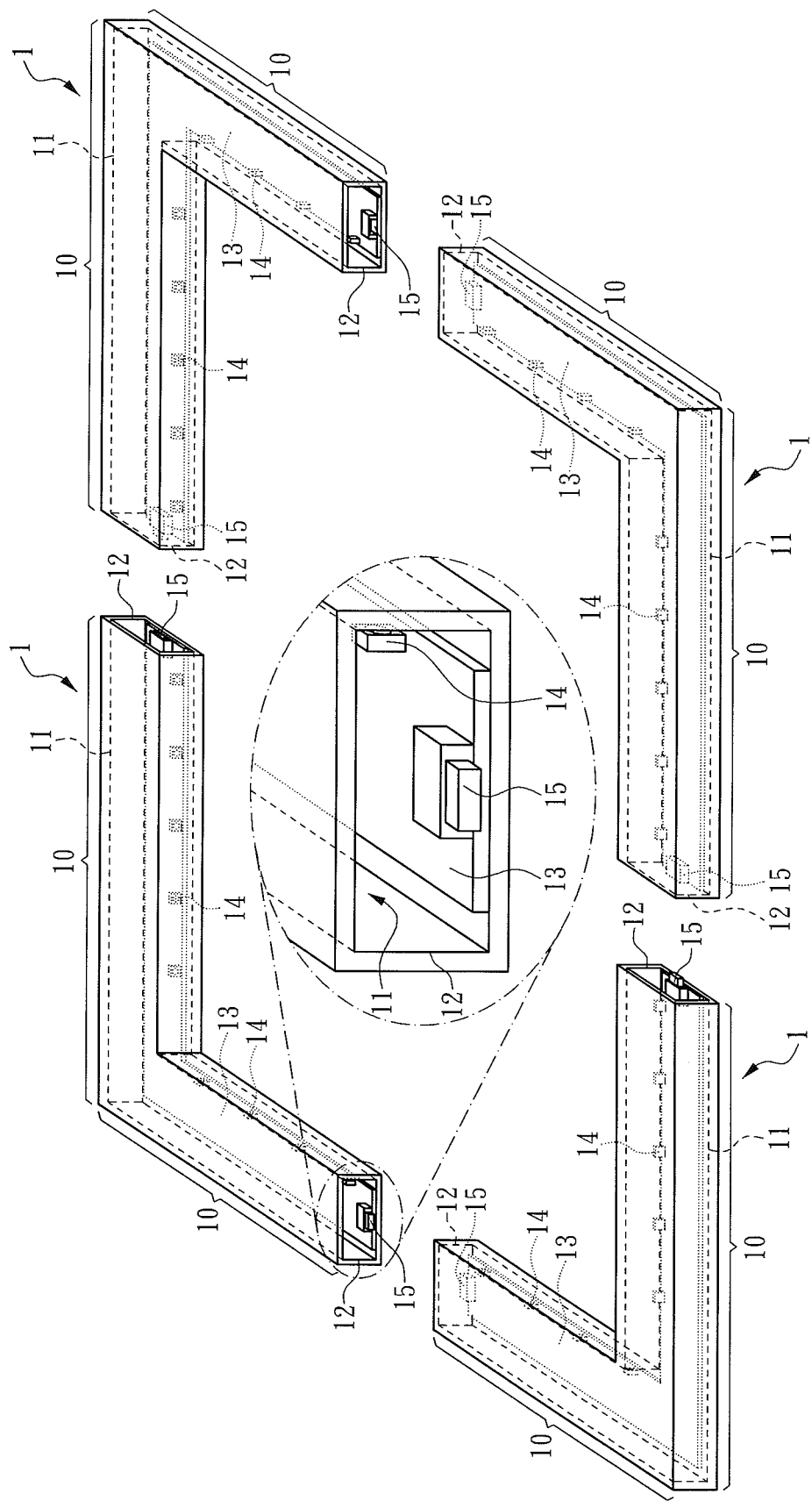
FIG. 1 is an exploded view of an assembling infrared touch control module according to an embodiment of the invention.

Reference will now be made in detail to the preferred embodiments of the invention, examples of which are illustrated in the accompanying drawings. Wherever possible, the same reference numbers are used in the drawings and the description to refer to the same or like parts.

Figure 2:
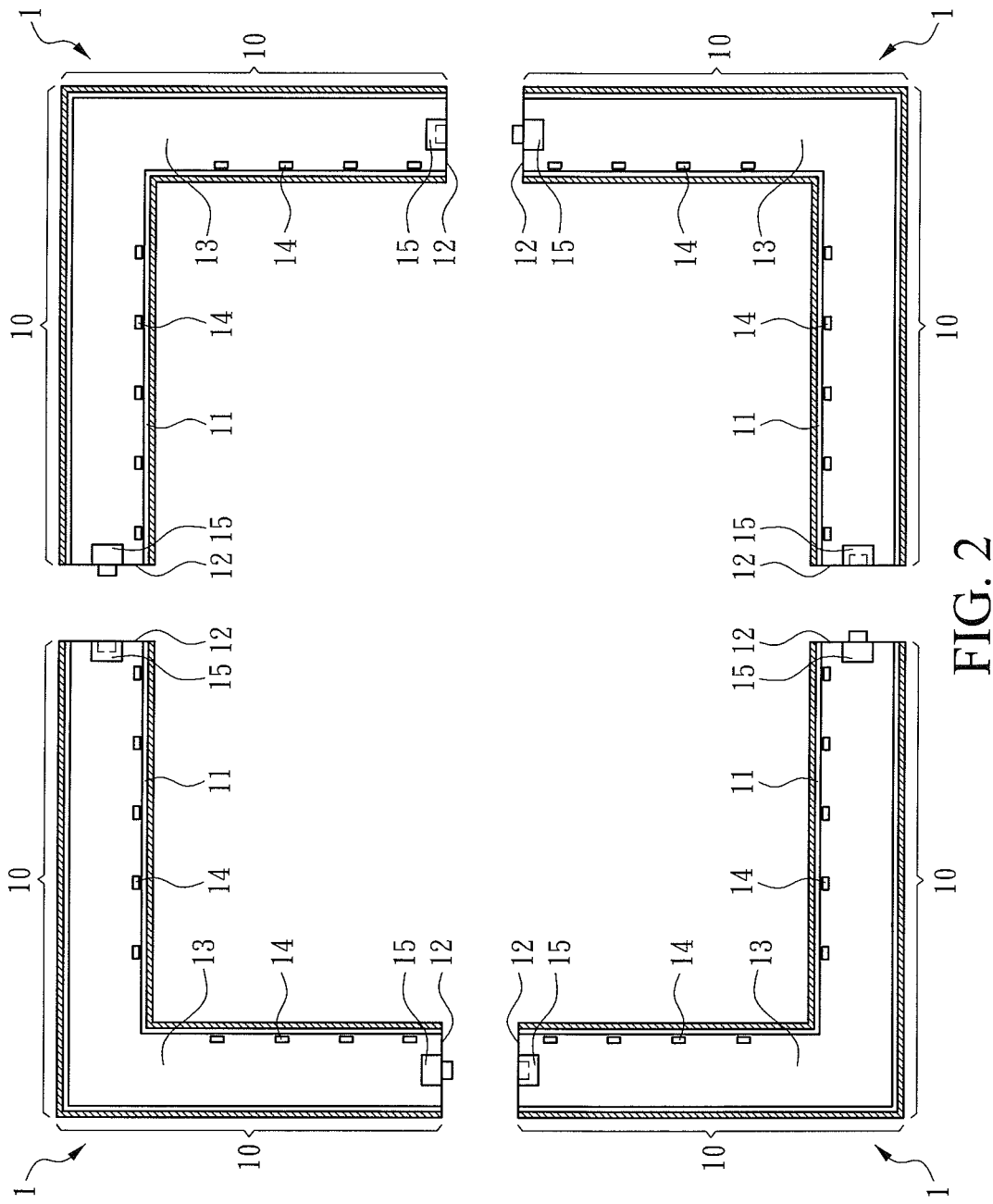
FIG. 2 is a cross-sectional top plan view of the assembling infrared touch control module shown in FIG. 1.

FIG. 1 is an exploded view of an assembling infrared touch control module according to an embodiment of the invention, and FIG. 2 is a cross-sectional top plan view of the assembling infrared touch control module shown in FIG. 1. Referring to FIGS. 1 and 2, an assembling infrared touch control module includes four L-shaped first frame members 1. Each first frame member 1 has two arms 10, and each arm 10 has a free end and a connected end. The connected ends of the two arms 10 are connected to each other, and the two arms 10 are perpendicular to each other to form the "L-shaped" first frame member 1. Each first frame member 1 has a first space 11 and two first openings 12 in communication with the first space 11. The first space 11 is disposed in the two arms 10 of the first frame member 1, and the two first openings 12 are disposed at two free ends of the two arms 10 of the first frame member 1, respectively. In other words, each first frame member 1 is of a hollow, bended prism structure. In the embodiment, each first frame member 1 has a rectangular cross-section, but the invention is not limited to the embodiment. In an alternative embodiment, each first frame member may have a trapezoidal or semicircular cross-section.

Each first space 11 has a first circuit board 13 therein. Each first circuit board 13 has a plurality of first infrared transmitter/receiver components 14 and two first connectors 15. The first infrared transmitter/receiver components 14 are disposed on the first circuit board 13 in the two arms 10, and the two first connectors 15 are disposed on the first circuit board 13 at the two first openings 12, respectively. In the embodiment, each first circuit board 13 is an L-shaped circuit board corresponding to the L-shaped first frame member 1, but the invention is not limited to the embodiment. In an alternative embodiment, each first circuit board may include two rectangular circuit boards, in which the two rectangular circuit boards are disposed in the two arms 10 of the first frame member 1, respectively, and are electrically connected to each other by inner wiring. In addition, in the embodiment, each first connector 15 is a SPI connector, but the invention is not limited to the embodiment. In an alternative embodiment, each first connector may be a universal serial bus (USB) connector and SO on.

The four first frame members 1 may be assembled together to form a first frame by the first connectors 15.

Figure 3:
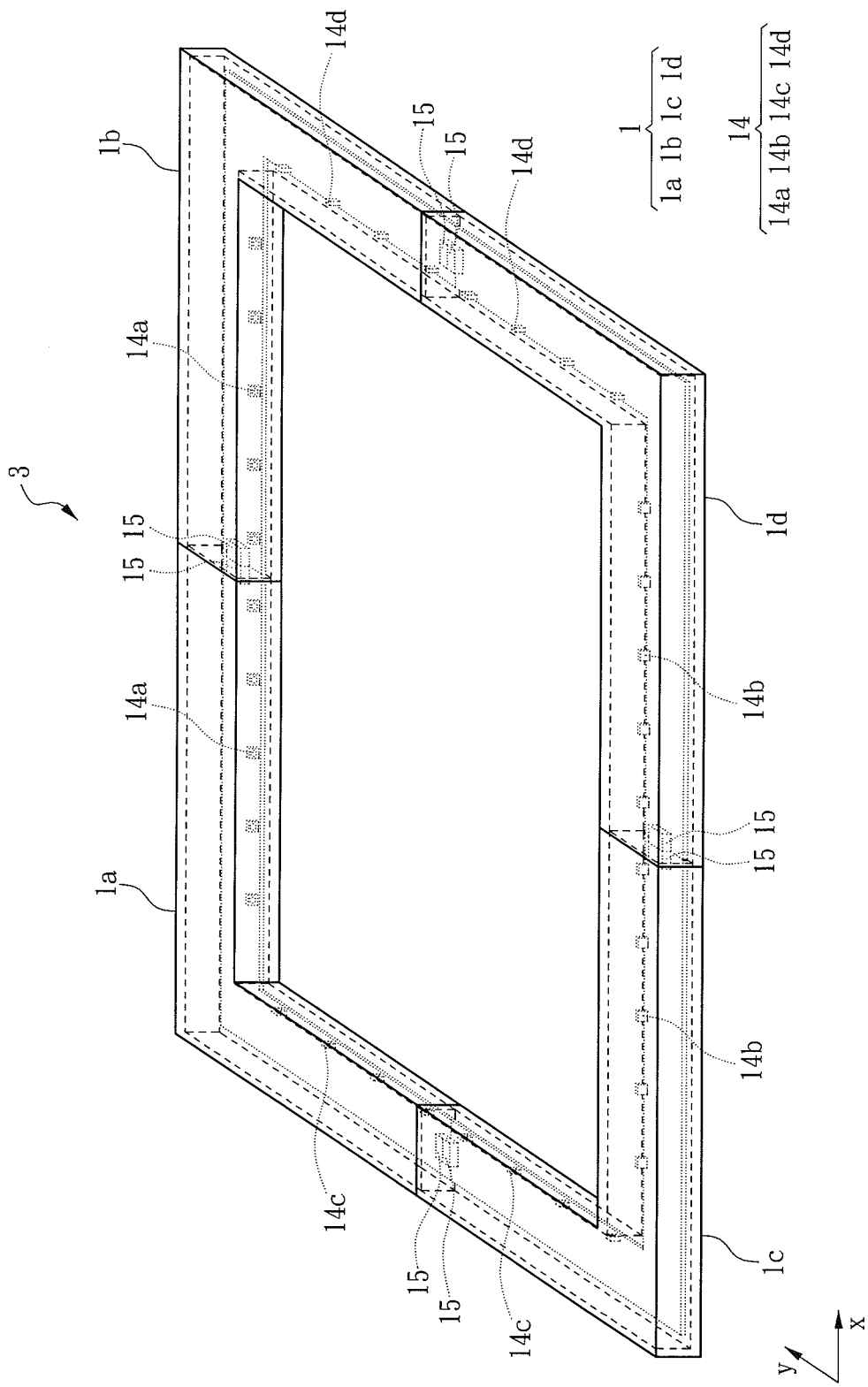
FIG. 3 is an assembled view of the assembling infrared touch control module shown in FIG. 1.
Figure 4:
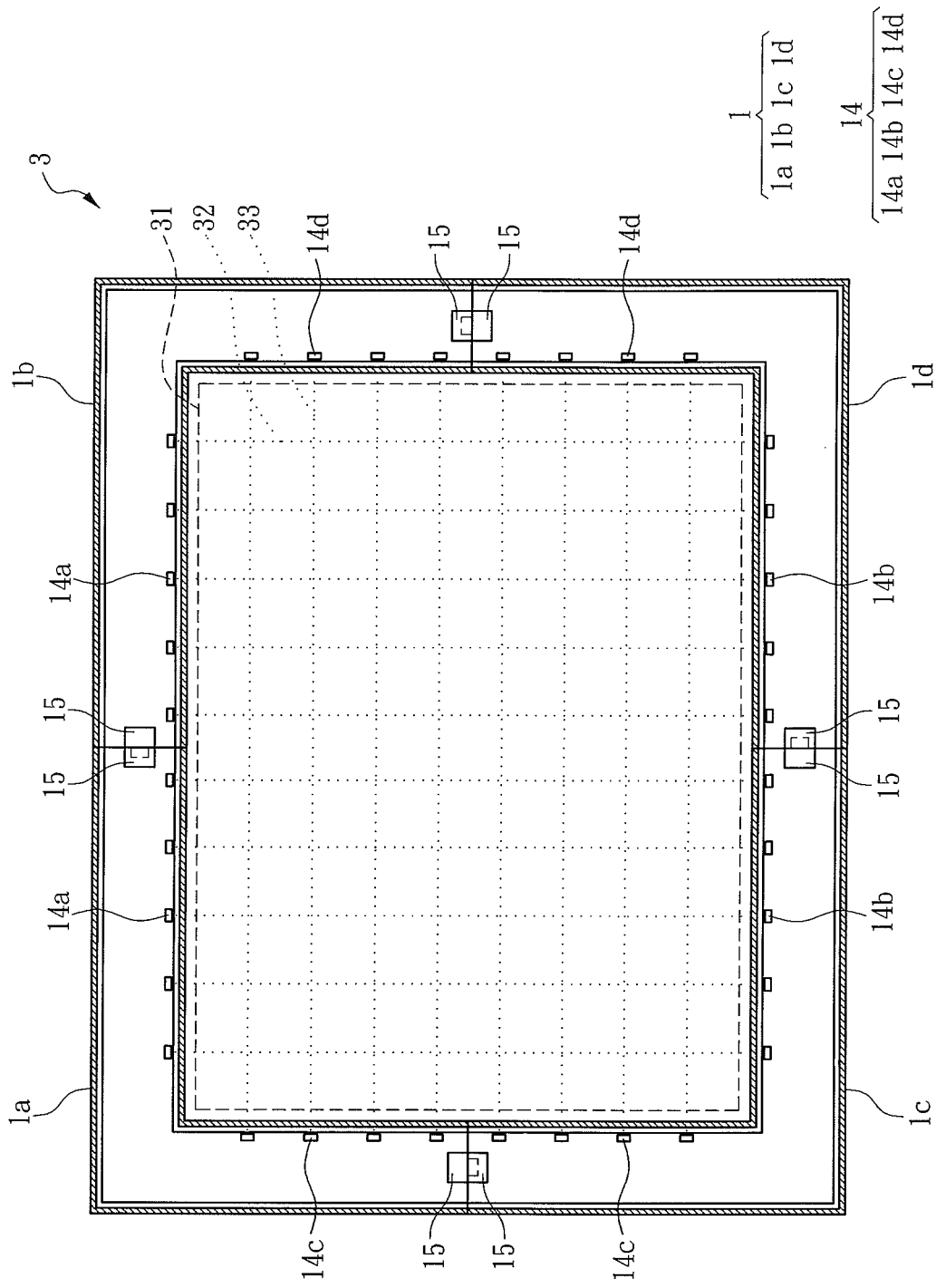
FIG. 4 is a cross-sectional top plan view of the assembling infrared touch control module shown in FIG. 3.

FIG. 3 is an assembled view of the assembling infrared touch control module shown in FIG. 1, and FIG. 4 is a cross-sectional top plan view of the assembling infrared touch control module shown in FIG. 3. Referring to FIGS. 3 and 4, for convenient explanation, the four first frame members 1 shown in FIG. 1 are represented as 1a, 1b, 1c, and 1d (hereinafter called 1a-1d) shown in FIGS. 3 and 4, respectively. The first infrared transmitter/receiver components 14 shown in FIG. 1 are represented as 14a, 14b, 14c, and 14d (hereinafter called 14a-14d) shown in FIGS. 3 and 4, respectively, in which 14a and 14c refer to first infrared transmitter components, and 14b and 14d refer to first infrared receiver components. The four first frame members 1a-1d are assembled together to form a first frame 3 by the first connectors 15, and the first infrared transmitter/receiver components 14a-14d consist of an infrared scanning array to provide a first active touch area 31 for the first frame 3. In the embodiment, the first infrared transmitter components 14a arranged in the x direction emit infrared rays 32, and the infrared rays 32 are received by the first infrared receiver components 14b arranged in the x direction, respectively. The first infrared transmitter components 14c arranged in the y direction emit infrared rays 33, and the infrared rays 33 are received by the first infrared receiver components 14d arranged in the y direction. Accordingly, the first infrared transmitter/receiver components 14a-14d disposed in the first frame members 1a-1d should be matched. In the embodiment, if the first infrared transmitter/receiver components disposed in one arm of the first frame members 1a are the first infrared transmitter components 14a, the first infrared transmitter/receiver components disposed in one arm of the first frame members 1c (opposite to one arm of the first frame members 1a) should be the first infrared receiver components 14b. If the first infrared transmitter/receiver components disposed in the other arm of the first frame members 1a are the first infrared transmitter components 14c, the first infrared transmitter/receiver components disposed in one arm of the first frame members 1b (opposite to the other arm of the first frame members 1a) should be the first infrared receiver components 14d.

Each first circuit board 13 may further have a microcontroller unit (MCU), a timing controller and a multiplexer thereon (not shown). A program may be pre-installed in one of the MCUs of the first circuit boards 13 of the four first frame members 1. The program is executed to check whether the frame is correctly assembled or not, to set a gain and a scanning type for the infrared transmitter/receiver components, and to set a touch control function adapted to an extended area which is within the active touch area and outside an active display area of a display device. In the embodiment, when the four first frame members 1 are assembled together to form the first frame 3, a user may operate the program pre-installed in one of the four first frame members 1 to be executed to check whether the first frame 3 is correctly assembled or not. If the first frame 3 is correctly assembled, the program may automatically set a gain and a scanning type for the first infrared transmitter/receiver components 14. In addition, when the first active touch area 31 of the first frame 3 is larger than an active display area of a display device, the user may further operate the program to set a touch control function adapted to an extended area which is within the first active touch area 31 and outside the active display area.

Figure 5:
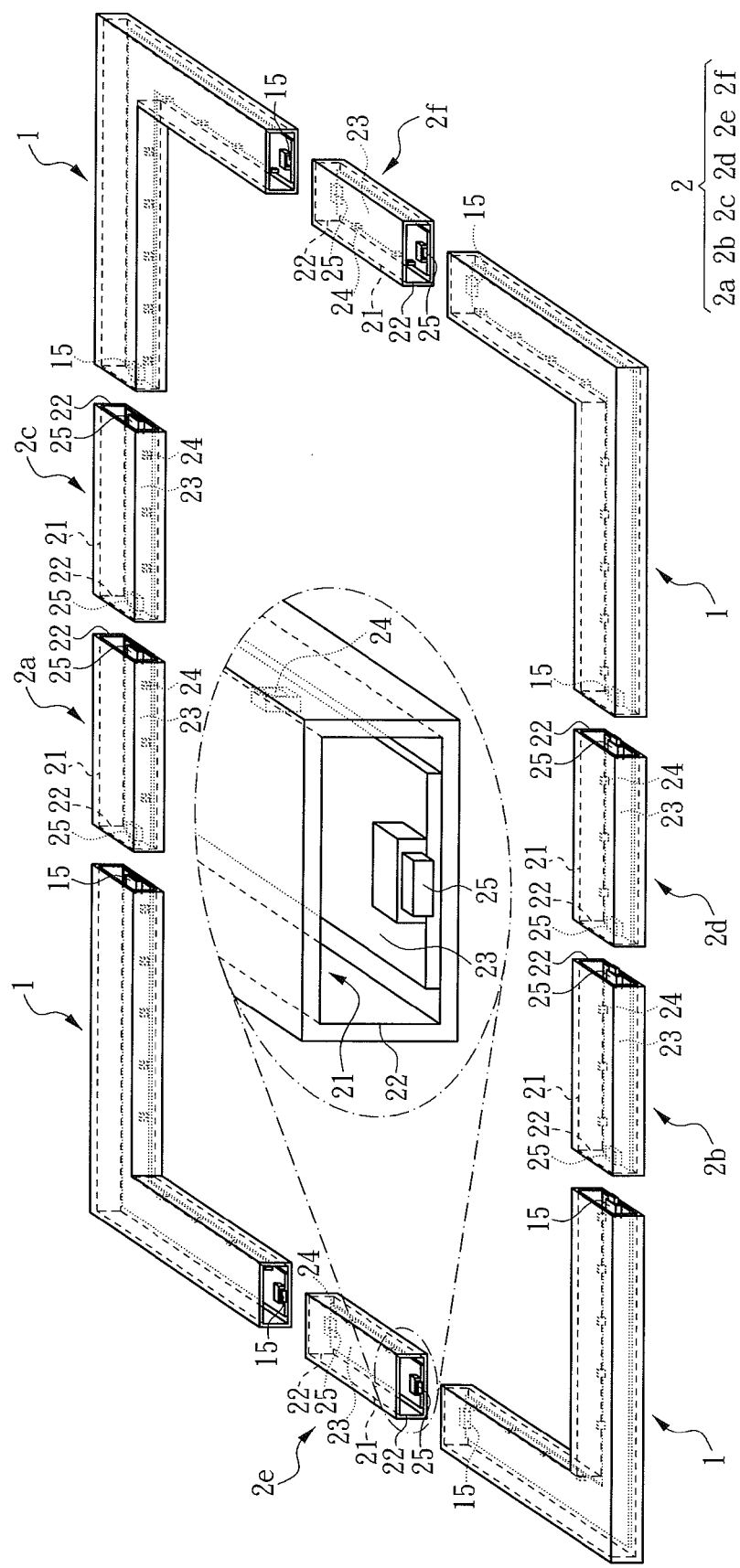
FIG. 5 is an exploded view of an assembling infrared touch control module according to another embodiment of the invention.
Figure 6:
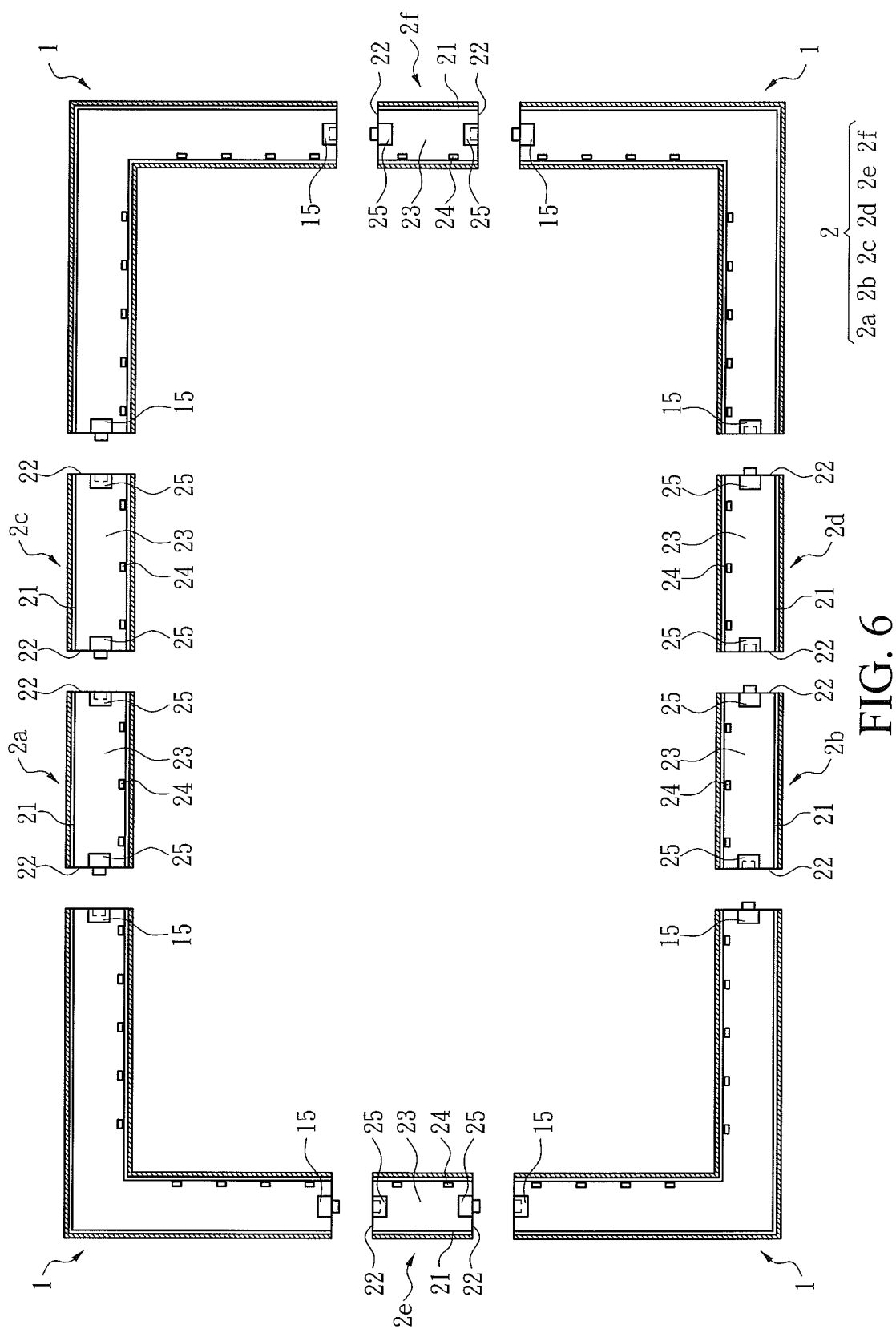
FIG. 6 is a cross-sectional top plan view of the assembling infrared touch control module shown in FIG. 5.

FIG. 5 is an exploded view of an assembling infrared touch control module according to another embodiment of the invention, and FIG. 6 is a cross-sectional top plan view of the assembling infrared touch control module shown in FIG. 5. Referring to FIGS. 5 and 6, besides the four first frame members 1, the assembling infrared touch control module further includes a plurality of straight second frame members 2a, 2b, 2c, 2d, 2e, and 2f (hereinafter called 2a-2f). The second frame members 2a-2f should be matched in pairs in length. In the embodiment, the pair of the second frame members 2a and 2b have the same length, the pair of the second frame members 2c and 2d have the same length, and the pair of the second frame members 2e and 2f have the same length. Each second frame member (e.g. 2e) has a second space 21 and two second openings 22 in communication with the second space 21. The second space 21 is disposed in the second frame member (e.g. 2e), and the two second openings 22 are disposed at two ends of the second frame member (e.g. 2e), respectively. In other words, each second frame member 2a, 2b, 2c, 2d, 2e, or 2f is of a hollow, straight prism structure. In the embodiment, each second frame member 2a, 2b, 2c, 2d, 2e, or 2f should be matched to the first frame members 1 to have a rectangular cross-section, so that the second frame members 2a-2f and the first frame members 1 are assembled together to have a consistent, smooth appearance.

Each second space 21 has a second circuit board 23 therein. Each second circuit board 23 has a plurality of second infrared transmitter/receiver components 24 and two second connectors 25. The second infrared transmitter/receiver components 24 are disposed on the second circuit board 23, and the two second connectors 25 are disposed on the second circuit board 23 at the two second openings 22, respectively. In the embodiment, each second connector 25 should be matched to the first connectors 15 to be a SPI connector.

The four first frame members 1 and the second frame members 2a-2f matched in pairs may be assembled together to form a second frame by the first connectors 15 and the second connectors 25.

Figure 7:
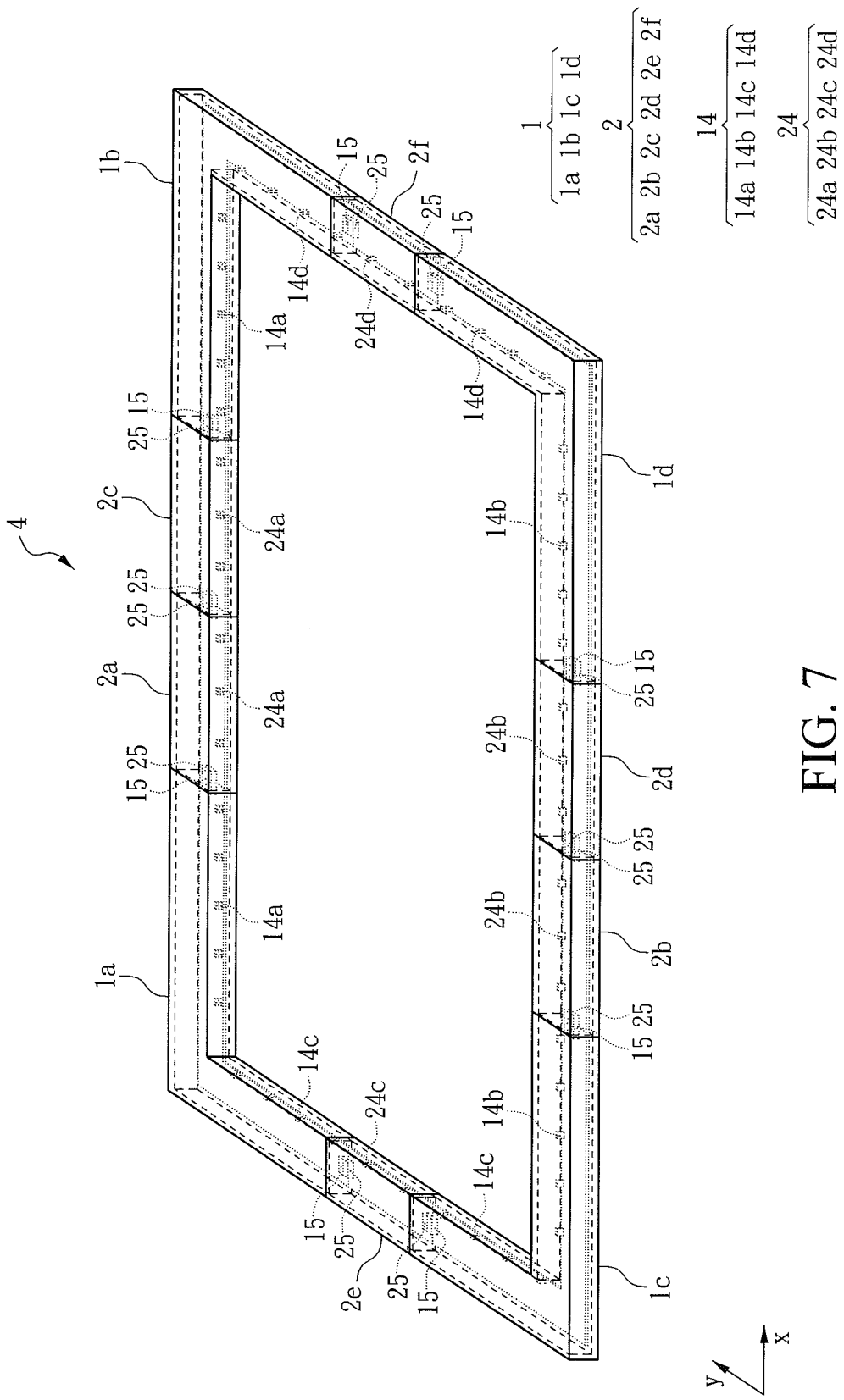
FIG. 7 is an assembled view of the assembling infrared touch control module shown in FIG. 5.
Figure 8:
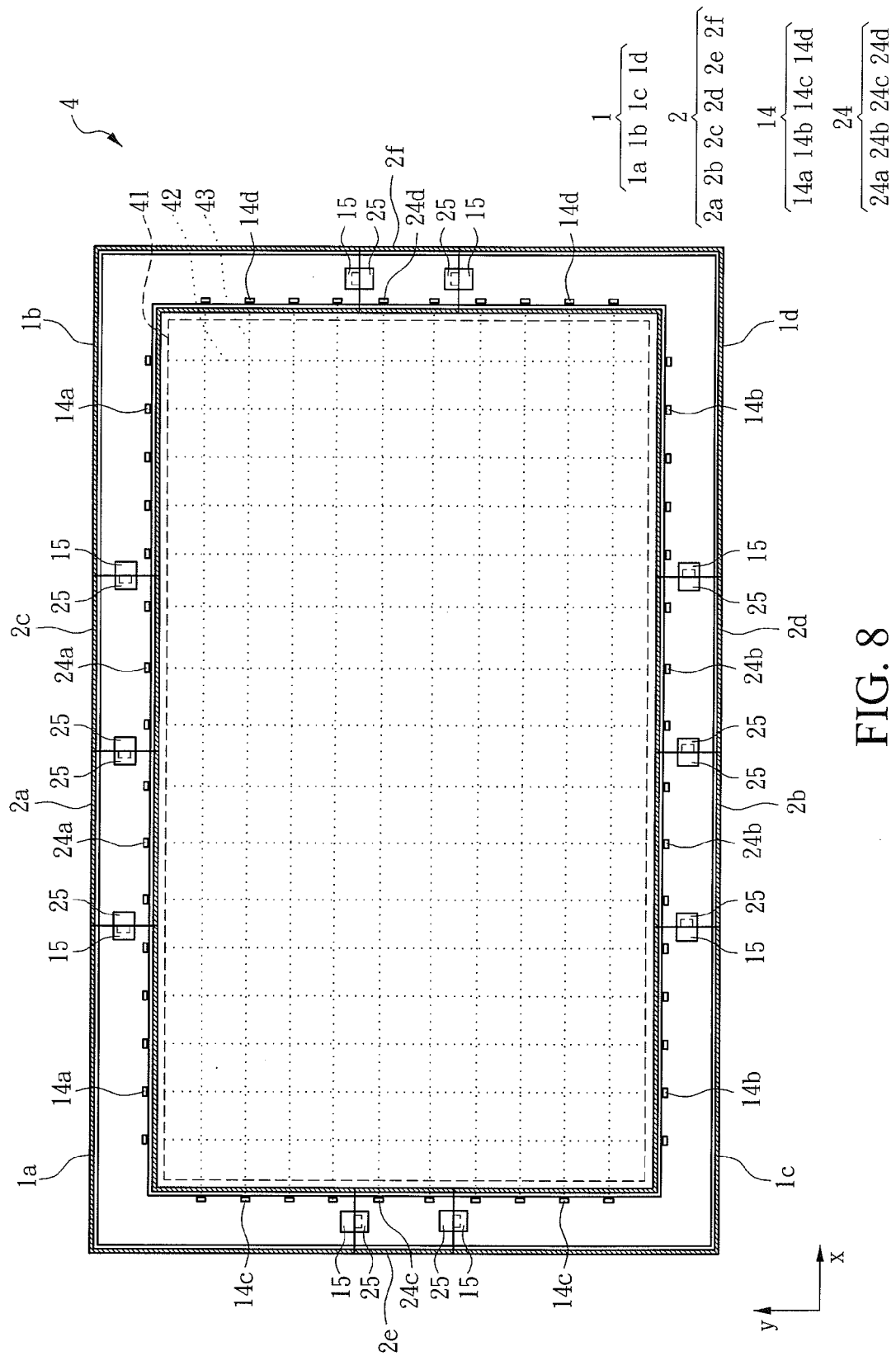
FIG. 8 is a cross-sectional top plan view of the assembling infrared touch control module shown in FIG. 7.

FIG. 7 is an assembled view of the assembling infrared touch control module shown in FIG. 5, and FIG. 8 is a cross-sectional top plan view of the assembling infrared touch control module shown in FIG. 7. Referring to FIGS. 7 and 8, for convenient explanation, the four first frame members 1 shown in FIG. 5 are represented as 1a-1d shown in FIGS. 7 and 8, respectively, and, the second infrared transmitter/receiver components 24 shown in FIG. 5 are represented as 24a, 24b, 24c, and 24d (hereinafter called 24a-24d) shown in FIGS. 7 and 8, respectively, in which 24a and 24c refer to second infrared transmitter components, and 24b and 24d refer to second infrared receiver components. The four first frame members 1a-1d and the second frame members 2a-2f matched in pairs are assembled together to form a second frame 4 by the first connectors 15 and the second connectors 25, and the first infrared transmitter/receiver components 14a-14d and the second infrared transmitter/receiver components 24a-24d consist of another infrared scanning array to provide a second active touch area 41 for the second frame 4. In the embodiment, the first infrared transmitter components 14a and the second infrared transmitter components 24a arranged in the x direction emit infrared rays 42, and the infrared rays 42 are received by the first infrared receiver components 14b and the second infrared receiver components 24b arranged in the x direction, respectively. The first infrared transmitter components 14c and the second infrared transmitter components 24c arranged in the y direction emit infrared rays 43, and the infrared rays 43 are received by the first infrared receiver components 14d and the second infrared receiver components 24d arranged in the y direction. Accordingly, not only the second frame members 2a-2f should be matched in pairs in length, but also the second infrared transmitter/receiver components 24a-24d disposed in the second frame members 2a-2f should be matched. In the embodiment, if the second infrared transmitter/receiver components disposed in the second frame members 2a are the second infrared transmitter components 24a, the second infrared transmitter/receiver components disposed in the second frame members 2b (opposite to the second frame members 2a) should be the second infrared receiver components 24b.

Each second circuit board 23 may further have a MCU, a timing controller and a multiplexer thereon (not shown). In the embodiment, when the four first frame members 1a-1d and the second frame members 2a-2f matched in pairs are assembled together to form the second frame 4, the user may operate the program pre-installed in one of the four first frame members 1a-1d to be executed to check whether the second frame 4 is correctly assembled or not. If the second frame 4 is correctly assembled, the program may automatically set a gain and a scanning type for the first infrared transmitter/receiver components 14 and the second infrared transmitter/receiver components 24. In addition, when the second active touch area 41 of the second frame 4 is larger than an active display area of a display device, the user may further operate the program to set a touch control function adapted to an extended area which is within the second active touch area 41 and outside the active display area.

It is noted that whether the first frame 3 or the second frame 4, the assembling infrared touch control module according to the invention may be designed to be a built-in or add-on infrared touch control module.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

We claim:

1. An assembling infrared touch control module comprising four L-shaped first frame members, with each L-shaped first frame member having a first space therein and two first openings at two free ends of two arms thereof, respectively, in communication with the first space, with each first space having a first circuit board therein, with each first circuit board having a plurality of first infrared transmitter and receiver components thereon in the two arms and two first connectors thereon at the two first openings, respectively, with the four L-shaped first frame members assembled together to form a first frame by the two first connectors, with the plurality of first infrared transmitter and receiver components providing a first active touch area for the first frame, wherein when the four L-shaped first frame members are assembled together to form the first frame, a program pre-installed in one of the four L-shaped first frame members is executed to check whether the first frame is correctly assembled or not, and, when the first frame is correctly assembled, a gain and a scanning type for the plurality of first infrared transmitter and receiver components are automatically set by the program.

2. The assembling infrared touch control module as claimed in claim 1, wherein each L-shaped first frame member has a rectangular, trapezoidal, or semicircular cross-section.

3. The assembling infrared touch control module as claimed in claim 1, wherein each first connector is a serial peripheral interface (SPI) connector.

4. The assembling infrared touch control module as claimed in claim 1, wherein when the first active touch area of the first frame is larger than an active display area of a display device, a touch control function adapted to an extended area which is within the first active touch area and outside the active display area is set by the program.

5. An assembling infrared touch control module comprising four L-shaped first frame members, with each L-shaped first frame member having a first space therein and two first openings at two free ends of two arms thereof, respectively, in communication with the first space, with each first space having a first circuit board therein, with each first circuit board having a plurality of first infrared transmitter and receiver components thereon in the two arms and two first connectors thereon at the two first openings, respectively, with the four L-shaped first frame members assembled together to form a first frame by the two first connectors, with the plurality of first infrared transmitter and receiver components providing a first active touch area for the first frame; and a plurality of straight second frame members matched in pairs, with each straight second frame member having a second space therein and two second openings at two ends thereof, respectively, in communication with the second space, with each second space having a second circuit board therein, with each second circuit board having a plurality of second infrared transmitter or receiver components thereon and two second connectors thereon at the two second openings, respectively, with the four L-shaped first frame members and the plurality of straight second frame members matched in pairs being assembled together to form a second frame by the two first connectors and the two second connectors, with the plurality of first infrared transmitter and receiver components and the plurality of second infrared transmitter or receiver components providing a second active touch area for the second frame.

6. The assembling infrared touch control module as claimed in claim 5, wherein each L-shaped first frame member and each straight second frame member has a rectangular, trapezoidal, or semicircular cross-section.

7. The assembling infrared touch control module as claimed in claim 5, wherein each first connector and each second connector is a serial peripheral interface (SPI) connector.

8. The assembling infrared touch control module as claimed in claim 5, wherein when the four L-shaped first frame members and the plurality of straight second frame members matched in pairs are assembled together to form the second frame, a program pre-installed in one of the four L-shaped first frame members is executed to check whether the second frame is correctly assembled or not, and, when the second frame is correctly assembled, a gain and a scanning type for the plurality of first infrared transmitter and receiver components and the plurality of second infrared transmitter or receiver components are automatically set by the program.

9. The assembling infrared touch control module as claimed in claim 8, wherein when the second active touch area of the second frame is larger than an active display area of a display device, a touch control function adapted to an extended area which is within the second active touch area and outside the active display area is set by the program.

* * * * *